US009292595B2

United States Patent
Joshi et al.

(10) Patent No.: US 9,292,595 B2
(45) Date of Patent: Mar. 22, 2016

(54) CREATING NEW DOCUMENTS BASED ON GLOBAL INTENT AND LOCAL CONTEXT

(71) Applicant: INTERNATIONAL BUSINESS MACHINES CORPORATION, Armonk, NY (US)

(72) Inventors: Sachindra Joshi, New Delhi (IN); Sameep Mehta, New Delhi (IN); Mukesh K. Mohania, New Delhi (IN); Sumit Negi, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 268 days.

(21) Appl. No.: 14/154,263

(22) Filed: Jan. 14, 2014

(65) Prior Publication Data

US 2015/0199345 A1     Jul. 16, 2015

(51) Int. Cl.
     *G06F 17/30*     (2006.01)
     *G06F 17/24*     (2006.01)

(52) U.S. Cl.
     CPC .......... *G06F 17/30646* (2013.01); *G06F 17/24* (2013.01)

(58) Field of Classification Search
     CPC ....... G06F 17/21; G06F 17/24; G06F 17/243; G06F 17/30646
     See application file for complete search history.

(56) References Cited

U.S. PATENT DOCUMENTS

| 7,529,739 | B2 | 5/2009 | Raub |
| 7,747,611 | B1 | 6/2010 | Milic-Frayling et al. |
| 7,849,063 | B2 | 12/2010 | Stata et al. |
| 7,933,896 | B2 | 4/2011 | Dexter |
| 7,984,035 | B2 | 7/2011 | Levin et al. |
| 8,271,481 | B2 | 9/2012 | Oral et al. |
| 8,316,040 | B2 | 11/2012 | Guha |
| 8,380,721 | B2 | 2/2013 | Attaran Rezaei et al. |
| 2011/0289105 | A1* | 11/2011 | Hershowitz ........... G06F 17/241 707/769 |

OTHER PUBLICATIONS

Chirita et al.; "Beagle++: Semantically Enhanced Searching and Ranking on the Desktop"; The Semantic Web: Research and Applications, Lecture Notes in Computer Science, vol. 4011, 2006; pp. 348-362; retrieved from the Internet Jul. 29, 2013; URL: http://link.springer.com/chapter/10.1007/11762256_27.

(Continued)

*Primary Examiner* — William Spieler
(74) *Attorney, Agent, or Firm* — Schmeiser, Olsen & Watts; John Pivnichny

(57) ABSTRACT

An approach is provided for creating a new document. Keywords specifying a subject matter of the new document are received. Metadata of documents is determined to match keyword(s) included in the received keywords and the documents are retrieved. Based on a section being created in the new document, a ranked list of the retrieved documents is generated. A selection of a document included in the ranked list is received. The selected document is added to the new document. The new document is determined to be not complete. The keywords are refined based on the added document. Based on the subject matter and the refined keywords, the new document is completed by repeating the steps of determining the metadata, retrieving the documents, generating the ranked list, receiving the selection, and adding the selected document.

20 Claims, 6 Drawing Sheets

(56) References Cited

OTHER PUBLICATIONS

Duy et al.; "Combining global and local semantic contexts for improving biomedical information retrieval" ECIR'11 Proceedings of the 33rd European Conference on Advances in Information Retrieval; Apr. 22, 2011; pp. 375-386.

Anonymous; "Method to accelerate the search and the retrieval of text and multimedia documents"; IP.com; IP.com No. IPCOM000223270D; Electronic Publication Nov. 15, 2012; 4 pages.

* cited by examiner

- Overview
- Growing Data
  - Growth of Data vs. Time - GRAPHICS
- Key Clients
  - Logos
- Key Capabilities
- Business Case
- Technical Features
- Differentiators from Competitor

} 300

CREATING NEW DOCUMENTS BASED ON GLOBAL INTENT AND LOCAL CONTEXT

TECHNICAL FIELD

The present invention relates to a data processing method and system for generating a new document, and more particularly to a technique for creating a new document by reusing existing documents.

BACKGROUND

Known techniques of creating new documents provide a creation of web pages, Extensible Markup Language (XML) documents, scientific papers, reports, etc. Known approaches to creating a new document include a selection from pre-defined formats without reusing an existing document or an existing part of a document.

BRIEF SUMMARY

In a first embodiment, the present invention provides a method of creating a new document. The method includes a computer receiving keywords specifying a subject matter of the new document. The method further includes the computer determining metadata of documents or metadata of parts of the documents matches one or more keywords included in the received keywords. The method further includes the computer retrieving the documents or the parts of the documents whose metadata matches the one or more keywords. The method further includes, based on a section or subsection being created in the new document, the computer generating a ranked list of the retrieved documents or parts of the documents. The method further includes the computer receiving a selection of a document or a part of a document included in the ranked list. The method further includes the computer adding content to the new document. The added content is the document or the part of the document whose selection was received. The method further includes the computer determining the new document is not complete. The method further includes the computer refining the keywords based in part on the added content. The method further includes, based in part on the subject matter and the refined keywords, the computer completing the new document by repeating the steps of determining the metadata, retrieving the documents, generating the ranked list, receiving the selection, and adding the content.

In a second embodiment, the present invention provides a central processing unit (CPU); a memory coupled to the CPU; and a computer-readable, tangible storage device coupled to the CPU. The storage device includes instructions that are executed by the CPU via the memory to implement a method of creating a new document. The method includes the computer system receiving keywords specifying a subject matter of the new document. The method further includes the computer system determining metadata of documents or metadata of parts of the documents matches one or more keywords included in the received keywords. The method further includes the computer system retrieving the documents or the parts of the documents whose metadata matches the one or more keywords. The method further includes, based on a section or subsection being created in the new document, the computer system generating a ranked list of the retrieved documents or parts of the documents. The method further includes the computer system receiving a selection of a document or a part of a document included in the ranked list. The method further includes the computer system adding content to the new document. The added content is the document or the part of the document whose selection was received. The method further includes the computer system determining the new document is not complete. The method further includes the computer system refining the keywords based in part on the added content. The method further includes, based in part on the subject matter and the refined keywords, the computer system completing the new document by repeating the steps of determining the metadata, retrieving the documents, generating the ranked list, receiving the selection, and adding the content.

In a third embodiment, the present invention provides a computer program product including a computer-readable, tangible storage device and a computer-readable program code stored in the computer-readable, tangible storage device. The computer-readable program code includes instructions that are executed by a central processing unit (CPU) of a computer system to implement a method of creating a new document. The method includes the computer system receiving keywords specifying a subject matter of the new document. The method further includes the computer system determining metadata of documents or metadata of parts of the documents matches one or more keywords included in the received keywords. The method further includes the computer system retrieving the documents or the parts of the documents whose metadata matches the one or more keywords. The method further includes, based on a section or subsection being created in the new document, the computer system generating a ranked list of the retrieved documents or parts of the documents. The method further includes the computer system receiving a selection of a document or a part of a document included in the ranked list. The method further includes the computer system adding content to the new document. The added content is the document or the part of the document whose selection was received. The method further includes the computer system determining the new document is not complete. The method further includes the computer system refining the keywords based in part on the added content. The method further includes, based in part on the subject matter and the refined keywords, the computer system completing the new document by repeating the steps of determining the metadata, retrieving the documents, generating the ranked list, receiving the selection, and adding the content.

Embodiments of the present invention create a new document by automatically finding, presenting, and reusing content in existing documents that is relevant to the global intent of the new document and to the local context provided by already created sections of the new document.

DETAILED DESCRIPTION

Overview

A user who is attempting to create a new document may need access to content that already exists in previously created documents. Embodiments of the present invention creates a new document by automatically finding and reusing existing documents and parts of documents based on a high-level intent (i.e., global intent) of the new document and based on part(s) of the new document that are already created.

System for Creating a New Document Based on Global Intent and Local Context

Figure 1:
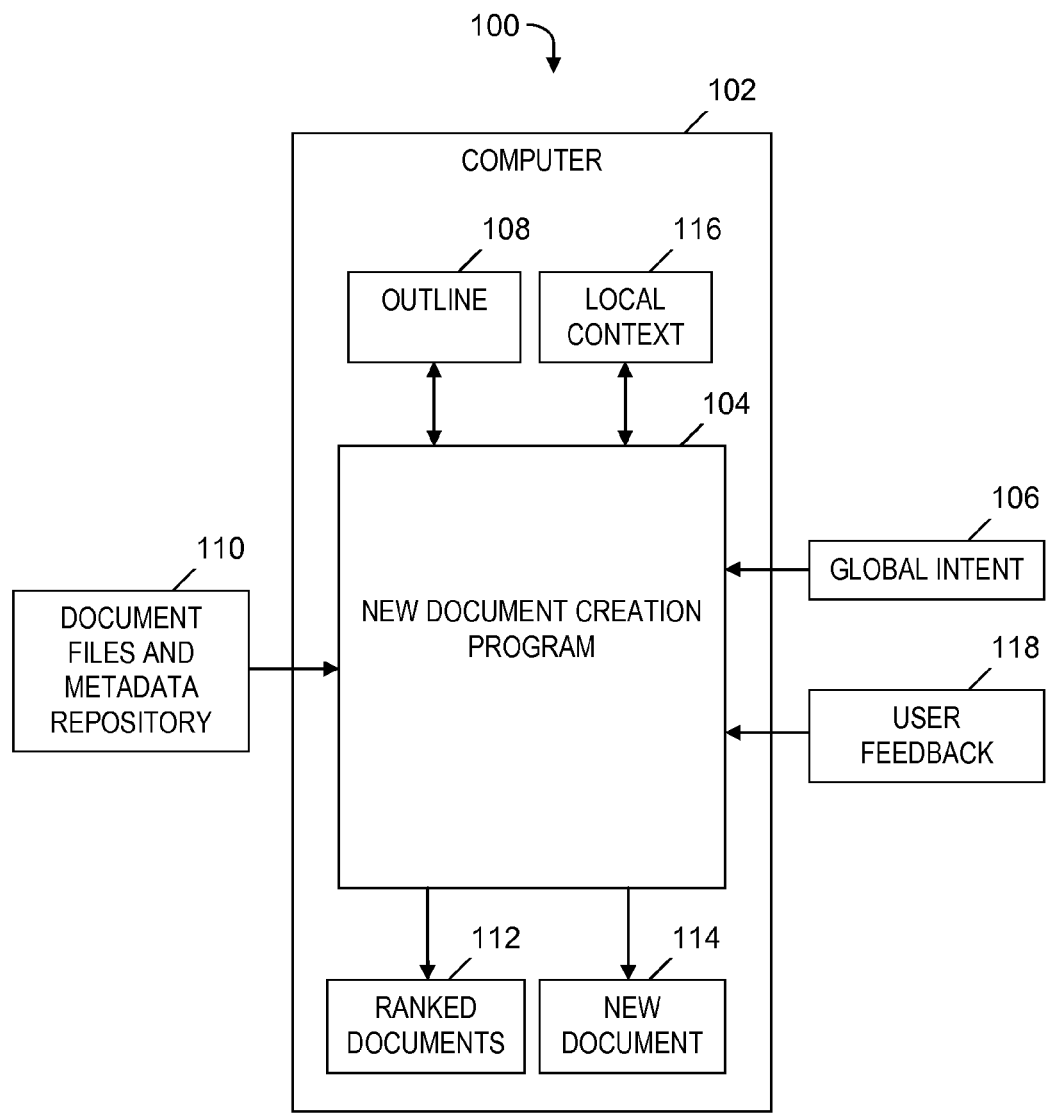
FIG. 1 is a block diagram of a system for creating a new document based on global intent and local context, in accordance with embodiments of the present invention.

FIG. 1 is a block diagram of a system for creating a new document based on global intent and local context, in accordance with embodiments of the present invention. A system 100 includes a computer 102, which executes a software-based new document creation program 104. New document creation program 104 receives user-specified global intent 106, which is a description of the overall goal, high-level intent or subject matter of a new document to be created. New document creation program 104 receives user-selected or user-created outline 108 of a structure of the new document to be created.

Based on the global intent 106 and the outline 108, new document creation program 104 retrieves documents and their associated metadata from a document files and metadata repository 110 to generate a list of ranked documents 112. In one embodiment, repository 110 is a database residing in a data storage device. After receiving a user's selection of a document or part of a document from the ranked documents 112, new document creation program 104 adds the selection to a new document 114. New document creation program expands keywords included in global intent 106 based on local context 116, which includes the selection that is added to new document 114. With the expanded keywords and user feedback 118 that further changes the keywords, new document creation program 104 repeats the generation of a list of ranked documents 112, receiving a user selection from the ranked documents, and adding the selection to new document 114 until the new document 114 is completed or until no documents are found to be included in ranked documents 112.

The functionality of the components of FIG. 1 is described in more detail in the discussion presented below relative to FIGS. 2A-2B.

Figure 2A:
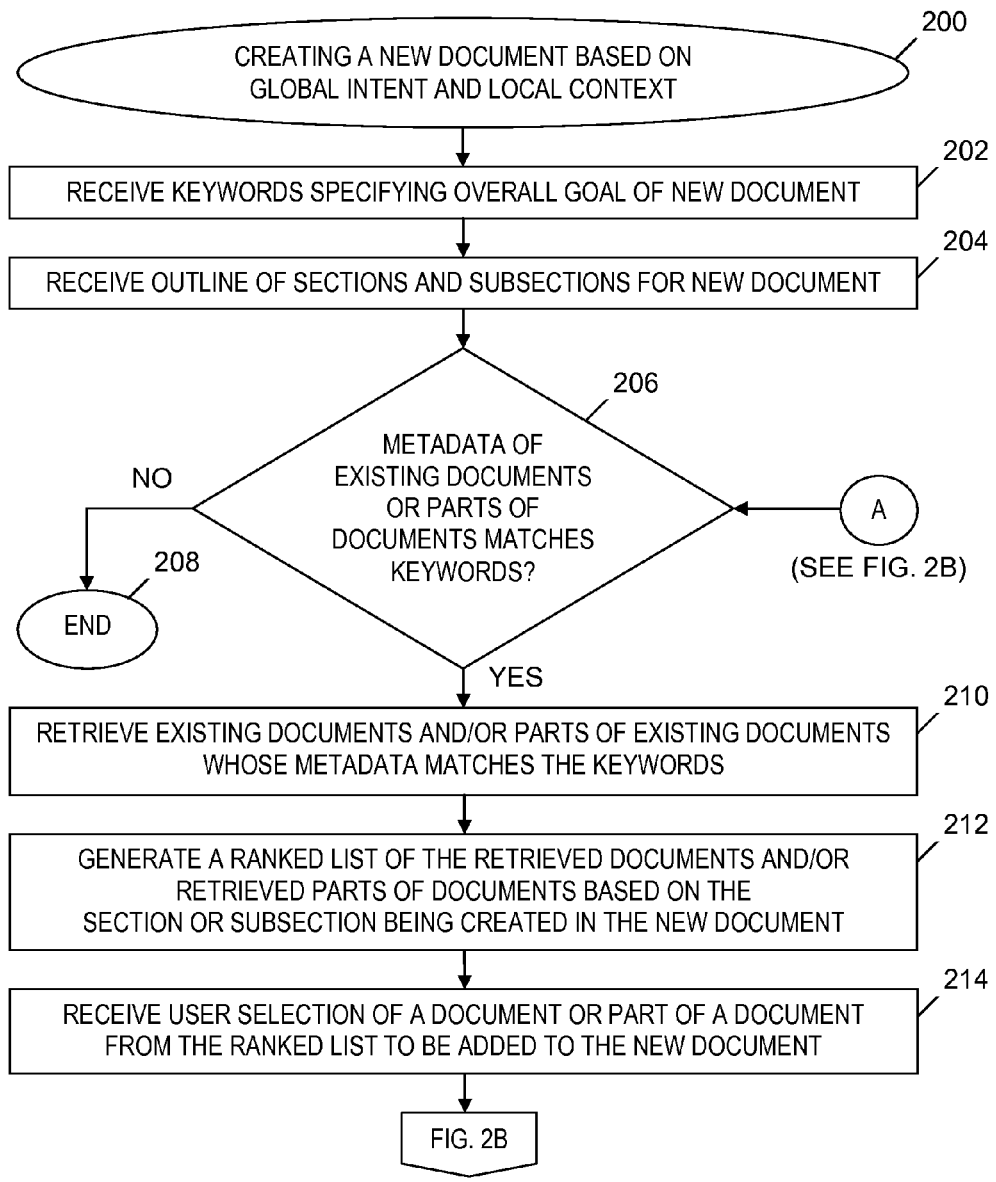
FIGS. 2A-2B depict a flowchart of a process of creating a new document based on global intent and local context, where the process is implemented in the system of FIG. 1, in accordance with embodiments of the present invention.
Figures 2B, 3:
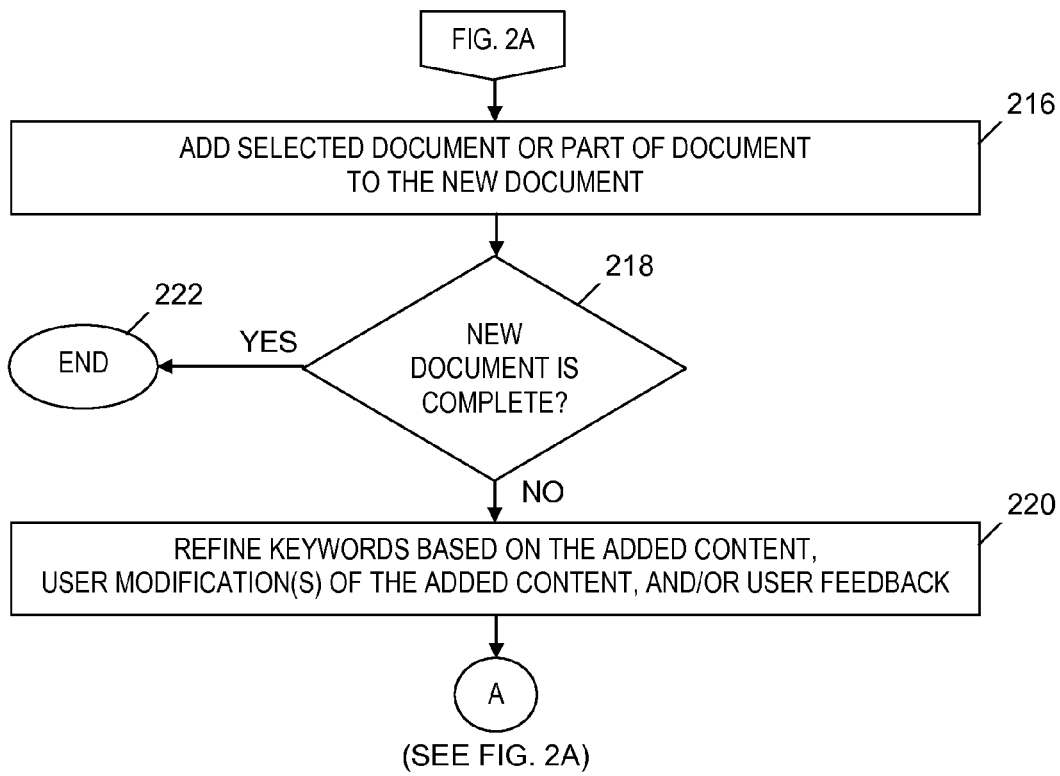
FIG. 3 is an exemplary outline used in the process of FIGS. 2A-2B, in accordance with embodiments of the present invention.

Process for Creating a New Document Based on Global Intent and Local Context FIGS. 2A-2B depict a flowchart of a process of creating a new document based on global intent and local context, where the process is implemented in the system of FIG. 1, in accordance with embodiments of the present invention. The process of FIGS. 2A-2B begins at step 200. In step 202, new document creation program 104 (see FIG. 1) receives keywords specifying the overall goal, intent or subject matter of new document 114 (see FIG. 1). The overall goal, intent or subject matter specified by the keywords received in step 202 is the global intent 106 (see FIG. 1).

In step 204, new document creation program 104 (see FIG. 1) receives outline 108 (see FIG. 1) that includes a structure of sections and subsections in new document 114 (see FIG. 1). An example of outline 108 (see FIG. 1) is shown in FIG. 3. A user can select outline 108 (see FIG. 1) from a set of pre-defined outlines or the user can make a new structure for outline 108 (see FIG. 1). For each name of a section or a subsection, the user may specify additional keywords that identify a finer level of subsection(s). In one embodiment, outline 108 includes names of key sections and subsections of new document 114 (see FIG. 1), as well as an indication of which sections and/or subsections include graphics.

The user can utilize a custom interface provided by computer 102 (see FIG. 1), which may include drop-down lists, filters, and text boxes to capture the user entries that provide the keywords in step 202 and the outline in step 204.

In step 206, new document creation program 104 (see FIG. 1) determines whether metadata of existing documents or existing parts of documents matches the keywords received in step 202. To make the determination in step 206, new document creation program 104 (see FIG. 1) examines the existing documents and existing parts of documents and their associated metadata in document files and metadata repository 110 (see FIG. 1) to find which documents or parts of documents have the received keywords marked as metadata.

If new document creation program 104 (see FIG. 1) determines in step 206 that the metadata of existing documents and parts of documents in repository 110 (see FIG. 1) does not match the keywords received in step 202, then the No branch of step 206 is taken and the process of FIGS. 2A-2B ends at step 208. Otherwise, if new document creation program 104 (see FIG. 1) determines in step 206 that the aforementioned metadata matches the keywords received in step 202, then the Yes branch of step 206 is taken and step 210 is performed.

The quality of the determination in step 206 can be drastically improved by expanding the set of keywords received in step 202 by using natural language processing (NLP) techniques such as stemming and synonyms, and by using one or more business glossaries to find related terms.

Step 206 may be efficiently performed by maintaining an inverted index on all keywords and mapping the keywords to the documents and parts of documents in repository 110 (see FIG. 1).

In step 210, new document creation program 104 (see FIG. 1) retrieves from repository 110 (see FIG. 1) the existing documents and/or existing parts of documents whose metadata matches the keywords received in step 202.

In one embodiment, prior to step 210, new document creation program 104 (see FIG. 1) receives a user selection indicating how aggressively or how conservatively the retrieval is performed in step 210. A user selection of aggressive retrieval results in step 210 aggressively retrieving existing documents and/or parts of existing documents; i.e., retrieving existing documents and/or parts of existing documents if one or more keywords in the received keywords match the metadata of the existing documents and parts of existing documents. A user selection of conservative retrieval results in step 210 conservatively retrieving existing documents and/or parts of existing documents; i.e., retrieving the existing documents and/or parts of existing documents only if all the keywords in the received keywords match the metadata of the existing documents and parts of existing documents.

In step 212, new document creation program 104 (see FIG. 1) generates a ranked list of the retrieved documents and/or retrieved parts of documents, where the ranking is based on the section or subsection being created in new document 114 (see FIG. 1). In one embodiment, the ranking of the documents and/or parts of documents is based on existing ranking principles such as semantic relevance, coverage, and overlap applied to a particular section of new document 114 (see FIG. 1) that is being created, or to content that has been previously used in creating other sections of new document 114 (see FIG. 1). For example, in the case of creating the first section of new document 114 (see FIG. 1), new document creation program 104 (see FIG. 1) assigns a highest rank to parts of documents that are semantically related to an Overview section.

Ranking using coverage ranks the documents or parts of documents based on how many keywords are included in the documents or parts of documents as compared to the total number of keywords received in step 202. Ranking using overlap ranks the documents or parts of documents by decreasing a rank of a document or part of a document that is substantially similar in content to a document or part of a document that is already ranked, so that documents or parts of documents that are not similar to the already ranked document or part of a document are ranked higher than the aforementioned substantially similar documents or parts of documents. By using overlap, a user can easily see a variety of documents or parts of documents as the user scans the ranked list generated in step 212, rather than seeing a cluster of redundant documents or redundant parts of documents.

In step 214, new document creation program 104 (see FIG. 1) receives a user selection of a document or a part of a document from the ranked list generated in step 212, where the user selection is to be added to new document 114 (see FIG. 1). The process of FIGS. 2A-2B continues with step 216 in FIG. 2B.

In step 216, new document creation program 104 (see FIG. 1) adds the document or part of the document to new document 114 (see FIG. 1), where the user selection of the added document or added part of the document was received in step 214 (see FIG. 2A). Although not shown in FIG. 2B, after step 216 and before step 218, new document creation program 104 (see FIG. 1) can receive a user-provided modification of the added document or added part of a document.

In step 218, if new document creation program 104 (see FIG. 1) determines the new document 114 is not complete, then the No branch of step 218 is taken and step 220 is performed.

In step 220, new document creation program 104 (see FIG. 1) refines or expands the set of keywords received in step 202 (see FIG. 2A) based on (1) the document or part of the document (i.e., the added content) that is added to new document 114 (see FIG. 1) in step 216; (2) user modification(s) of the added content; and/or (3) user feedback 118 (see FIG. 1) that explicitly changes the set of keywords received in step 202 (see FIG. 2A). The refinement or expansion of the keywords based on the aforementioned user modification(s) is an automatic identification of additional keywords based on the added content by new document creation program 104 (see FIG. 1), without requiring a user's explicit identification of the additional keywords. For example, while adding content for the Overview section of a presentation document about IBM® InfoSphere® Streams, new document creation program 104 (see FIG. 1) suggests "Java-Op" as an additional keyword based on the added content for the Overview section.

The result of step 220 provides the local context 116 (see FIG. 1) which forms part of the basis for the new document being created.

In one embodiment, the expansion of the set of keywords in step 220 is based in part on a query expansion technique.

By allowing the refinement or expansion of the set of keywords in step 220 and subsequent iterations of step 220, new document creation program 104 (see FIG. 1) does not require the user to provide precise keywords in the initial set of keywords received in step 202 (see FIG. 2A). Instead, the user can initially provide very broad keywords and narrow the focus of the keywords by using the guidance provided by the keyword refinement or expansion in step 220.

Following step 220, the process of FIGS. 2A-2B loops back to step 206 (see FIG. 2A) to check whether metadata associated with existing documents or parts of documents in repository 110 (see FIG. 1) matches the refined or expanded set of keywords.

Returning to step 218, if new document creation program 104 (see FIG. 1) determines the new document 114 (see FIG. 1) is complete, then the new document 114 (see FIG. 1) is created based on global intent 106 (see FIG. 1) and local context 116 (see FIG. 1) and the process of FIGS. 2A-2B ends at step 222.

EXAMPLES

FIG. 3 is an exemplary outline used in the process of FIGS. 2A-2B, in accordance with embodiments of the present invention. For example, a user is creating new document 114 as a presentation document for IBM® InfoSphere® Streams and specifies the overall goal of new document 114 (see FIG. 1) by the keywords: IBM® InfoSphere® Streams, Streaming Data, Data in Motion, Text Analytics, Big Data, Annotation Query Language. IBM® InfoSphere® Streams is an advanced analytic platform offered by International Business Machines Corporation located in Armonk, N.Y. New document creation program 104 (see FIG. 1) receives the keywords in step 202 (see FIG. 2A). Continuing this example, the user makes an outline 300, which is an example of outline 108 (see FIG. 1). The outline 300 includes names of key sections and subsections in the new document 114 (see FIG. 1). For instance, outline 300 includes "Key Clients" as the name of a section, and "Logos" as a name of a subsection of the "Key Clients" section. Further, outline 300 includes an indication (i.e., "GRAPHICS") of a subsection (i.e., "Growth of Data vs. Time") that includes graphics. New document creation program 104 (see FIG. 1) receives outline 300 in step 204 (see FIG. 2A).

Figure 4A:
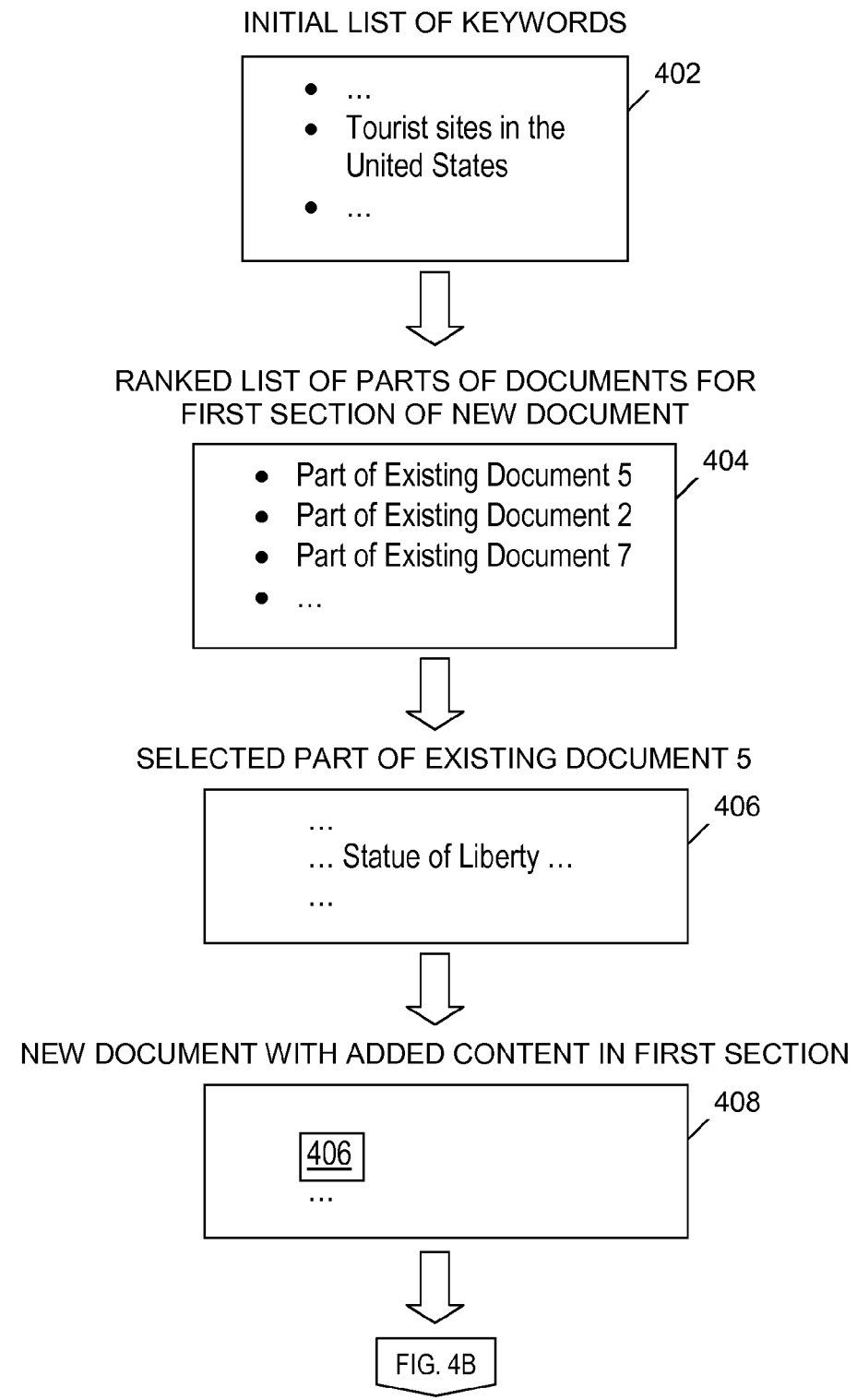
FIGS. 4A-4B depict an example of local context being used in the process of FIGS. 2A-2B, in accordance with embodiments of the present invention.
Figure 4B:
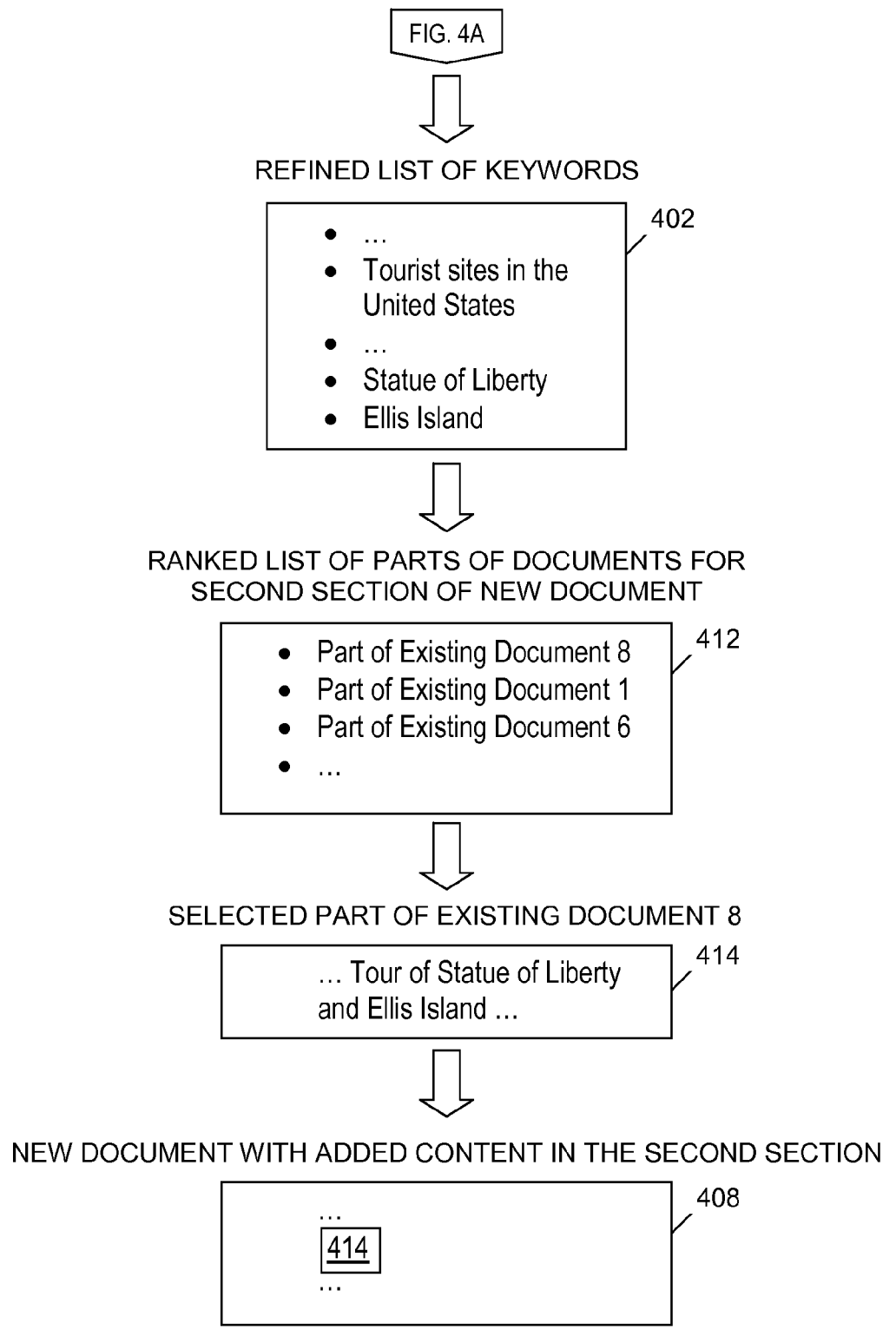

FIGS. 4A-4B depict an example of local context being used in the process of FIGS. 2A-2B, in accordance with embodiments of the present invention. An initial list of keywords 402 in FIG. 4A includes "Tourist sites in the United States." Keywords 402 is an example of the keywords received in step 202 (see FIG. 2A). A ranked list 404 includes parts of existing documents that new document creation program 104 (see FIG. 1) suggests as possible content to be added to the first section of a new document 408 (see FIG. 1). Ranked list 404 is an example of the ranked list generated in step 212 (see FIG. 2A).

The user selects the part of Existing Document 406 (i.e., "Part of Existing Document 5"), which includes the term "Statue of Liberty," and which is an example of the user selection received in step 214 (see FIG. 2A).

New document 408 includes newly added content which is the part of Existing Document 406. New document 408 is an example of new document 114 (see FIG. 1). New document 408 which includes newly added content 406 is an example of a result of step 216 (see FIG. 2B).

In FIG. 4B, the list of keywords 402 is refined by new document creation program 104 (see FIG. 1) to include the keywords: "Statue of Liberty" and "Ellis Island" based on local context, which includes the added content 406 (see FIG.

4A). Refined list of keywords 402 in FIG. 4B is an example of a result of step 220 (see FIG. 2B).

Using the refined list of keywords 402, new document creation program 104 (see FIG. 1) generates another ranked list 412 of parts of documents which are suggested as possible content to be added to a second section of new document 408. Ranked list 412 is an example of the ranked list generated in a subsequent iteration of step 212 (see FIG. 2A), which uses the local context that includes the refined list of keywords 402.

New document creation program 104 (see FIG. 1) receives a user selection of part of Existing Document 414 (i.e., "Part of Existing Document 8") as the content to be added to new document 408. Part of Existing Document 414 is an example of the user selection received in to subsequent iteration of step 214 (see FIG. 2A).

New document 408, which includes newly added content 414 (i.e., "Part of Existing Document 8") is an example of a result of a subsequent iteration of step 216 (see FIG. 2B).

Computer System

Figure 5:
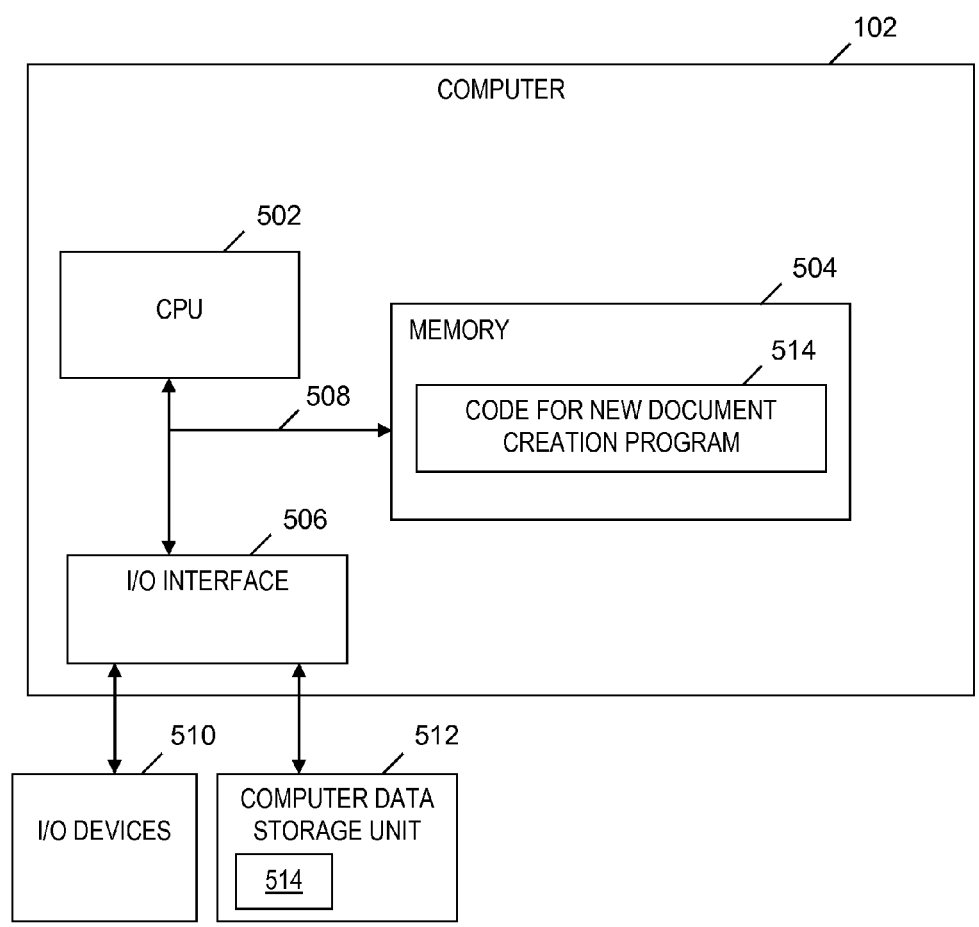
FIG. 5 is a block diagram of a computer that is included in the system of FIG. 1 and that implements the process of FIGS. 2A-2B in accordance with embodiments of the present invention.

FIG. 5 is a block diagram of a computer that is included in the system of FIG. 1 and that implements the process of FIGS. 2A-2B in accordance with embodiments of the present invention. Computer 102 generally includes a central processing unit (CPU) 502, a memory 504, an input/output (I/O) interface 506, and a bus 508. Further, computer 102 is coupled to I/O devices 510 and a computer data storage unit 512. CPU 502 performs computation and control functions of computer 102, including executing instructions included in program code 514 for program 104 (see FIG. 1) to perform a method of creating a new document based on global intent and local context, where the instructions are executed by CPU 502 via memory 504. CPU 502 may include a single processing unit, or be distributed across one or more processing units in one or more locations (e.g., on a client and server).

Memory 504 includes a known computer-readable storage medium, which is described below. In one embodiment, cache memory elements of memory 504 provide temporary storage of at least some program code (e.g., program code 514) in order to reduce the number of times code must be retrieved from bulk storage while instructions of the program code are executed. Moreover, similar to CPU 502, memory 504 may reside at a single physical location, including one or more types of data storage, or be distributed across a plurality of physical systems in various forms. Further, memory 504 can include data distributed across, for example, a local area network (LAN) or a wide area network (WAN).

I/O interface 506 includes any system for exchanging information to or from an external source. I/O devices 510 include any known type of external device, including a display device (e.g., monitor), keyboard, mouse, printer, speakers, handheld device, facsimile, etc. Bus 508 provides a communication link between each of the components in computer 102, and may include any type of transmission link, including electrical, optical, wireless, etc.

I/O interface 506 also allows computer 102 to store information (e.g., data or program instructions such as program code 514) on and retrieve the information from computer data storage unit 512 or another computer data storage unit (not shown). In one embodiment, program code 514 is stored on computer data storage unit 512. Computer data storage unit 512 includes a known computer-readable storage medium, which is described below. In one embodiment, computer data storage unit 512 is a non-volatile data storage device, such as a magnetic disk drive (i.e., hard disk drive) or an optical disc drive (e.g., a CD-ROM drive which receives a CD-ROM disk).

Memory 504 and/or storage unit 512 may store computer program code 514 that includes instructions that are executed by CPU 502 via memory 504 to create a new document based on global intent and local context. Although FIG. 5 depicts memory 504 as including program code 514, the present invention contemplates embodiments in which memory 504 does not include all of code 514 simultaneously, but instead at one time includes only a portion of code 514.

Further, memory 504 may include other systems not shown in FIG. 5, such as an operating system (e.g., Linux®) that runs on CPU 502 and provides control of various components within and/or connected to computer 102. Linux is a registered trademark of Linus Torvalds in the United States, other countries, or both.

In one embodiment, storage unit 512 and/or one or more other computer data storage units (not shown) that are coupled to computer 102 stores data included repository 110 (see FIG. 1).

As will be appreciated by one skilled in the art, in a first embodiment, the present invention may be a system; in a second embodiment, the present invention may be a method; and in a third embodiment, the present invention may be a computer program product. A component of an embodiment of the present invention may take the form of an entirely hardware-based component, an entirely software component (including firmware, resident software, micro-code, etc.) or a component combining software and hardware sub-components that may all generally be referred to herein as a "module".

An embodiment of the present invention may take the form of a computer program product embodied in one or more computer-readable medium(s) (e.g., memory 504 and/or computer data storage unit 512) having computer-readable program code (e.g., program code 514) embodied or stored thereon.

Any combination of one or more computer-readable mediums (e.g., memory 504 and computer data storage unit 512) may be utilized. In one embodiment, the computer-readable medium is a computer-readable storage medium. In another embodiment, the computer-readable medium is a computer-readable signal medium. As used herein, a computer-readable storage medium is not a computer-readable signal medium.

In one embodiment, the computer-readable storage medium is a physical, tangible computer-readable storage device or physical, tangible computer-readable storage apparatus that stores but does not propagate, and is not a transitory form of signal transmission. A computer-readable storage medium may include, for example, an electronic, magnetic, optical, electromagnetic, or semiconductor system, apparatus, device or any suitable combination of the foregoing. A non-exhaustive list of more specific examples of the computer-readable storage medium includes: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium is a physical, tangible storage medium that can contain or store a program (e.g., program 514) for use by or in connection with a system, apparatus, or device for carrying out instructions in the program, and which does not propagate. The term "computer-readable storage device" does not include signal propagation media such as copper cables, optical fibers and wireless transmission media.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with a system, apparatus, or device for carrying out instructions.

Program code (e.g., program code 514) embodied on a computer-readable medium may be transmitted using any appropriate medium, including but not limited to wireless, wireline, optical fiber cable, radio frequency (RF), etc., or any suitable combination of the foregoing.

Computer program code (e.g., program code 514) for carrying out operations for aspects of the present invention may be written in any combination of one or more programming languages, including an object oriented programming language such as Java®, Smalltalk, C++ or the like and conventional procedural programming languages, such as the "C" programming language or similar programming languages. Java and all Java-based trademarks are trademarks or registered trademarks of Oracle and/or its affiliates. Instructions of the program code may be carried out entirely on a user's computer, partly on the user's computer, as a stand-alone software package, partly on the user's computer and partly on a remote computer or entirely on the remote computer or server, where the aforementioned user's computer, remote computer and server may be, for example, computer 102 or another computer system (not shown) having components analogous to the components of computer 102 included in FIG. 5. In the latter scenario, the remote computer may be connected to the user's computer through any type of network (not shown), including a LAN or a WAN, or the connection may be made to an external computer (e.g., through the Internet using an Internet Service Provider).

Aspects of the present invention are described herein with reference to flowchart illustrations (e.g., FIGS. 2A-2B) and/or block diagrams of methods, apparatus (systems) (e.g., FIG. 1 and FIG. 5), and computer program products according to embodiments of the invention. It will be understood that each block of the flowchart illustrations and/or block diagrams, and combinations of blocks in the flowchart illustrations and/or block diagrams, can be implemented by computer program instructions (e.g., program code 514). These computer program instructions may be provided to one or more hardware processors (e.g., CPU 502) of a general purpose computer, special purpose computer, or other programmable data processing apparatus to produce a machine, such that the instructions, which are executed via the processor(s) of the computer or other programmable data processing apparatus, create means for implementing the functions/acts specified in the flowcharts and/or block diagram block or blocks.

These computer program instructions may also be stored in a computer-readable medium (e.g., memory 504 or computer data storage unit 512) that can direct a computer (e.g., computer 102), other programmable data processing apparatus, or other devices to function in a particular manner, such that the instructions (e.g., program 514) stored in the computer-readable medium produce an article of manufacture including instructions which implement the function/act specified in the flowcharts and/or block diagram block or blocks.

The computer program instructions may also be loaded onto a computer (e.g., computer 102), other programmable data processing apparatus, or other devices to cause a series of operational steps to be performed on the computer, other programmable apparatus, or other devices to produce a computer-implemented process such that the instructions (e.g., program 514) which are executed on the computer, other programmable apparatus, or other devices provide processes for implementing the functions/acts specified in the flowcharts and/or block diagram block or blocks.

Any of the components of an embodiment of the present invention can be deployed, managed, serviced, etc. by a service provider that offers to deploy or integrate computing infrastructure with respect to creating a new document based on global intent and local context. Thus, an embodiment of the present invention discloses a process for supporting computer infrastructure, where the process includes providing at least one support service for at least one of integrating, hosting, maintaining and deploying computer-readable code (e.g., program code 514) in a computer system (e.g., computer 102) including one or more processors (e.g., CPU 502), wherein the processor(s) carry out instructions contained in the code causing the computer system to create a new document based on global intent and local context. Another embodiment discloses a process for providing at least one support service for at least one of creating, integrating, hosting, maintaining, and deploying computer-readable program code 514 in computer 102, where program code 514 is executed by CPU 502 to implement the steps included in FIGS. 2A-2B.

The flowchart in FIGS. 2A-2B and the block diagrams in FIG. 1 and FIG. 5 illustrate the architecture, functionality, and operation of possible implementations of systems, methods, and computer program products according to various embodiments of the present invention. In this regard, each block in the flowcharts or block diagrams may represent a module, segment, or portion of code (e.g., program code 514), which includes one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:
1. A method of creating a new document, the method comprising the steps of:
   a computer receiving keywords specifying a subject matter of the new document;
   the computer determining metadata of documents or metadata of parts of the documents matches one or more keywords included in the received keywords;

the computer retrieving the documents or the parts of the documents whose metadata matches the one or more keywords;

based on a section or subsection being created in the new document, the computer generating a ranked list of the retrieved documents or parts of the documents;

the computer receiving a selection of a document or a part of a document included in the ranked list;

the computer adding content to the new document, the added content being the document or the part of the document whose selection was received;

the computer determining the new document is not complete;

the computer refining the keywords based in part on the added content; and based in part on the subject matter and the refined keywords, the computer completing the new document by repeating the steps of determining the metadata, retrieving the documents, generating the ranked list, receiving the selection, and adding the content.

2. The method of claim 1, further comprising the steps of:

the computer system receiving an outline of sections and subsections in the new document; and the computer receiving an association between the outline and the received keywords, wherein the step of completing the new document is based in part on the outline and the association between the outline and the received keywords.

3. The method of claim 2, wherein the step of completing the new document is further based on a global intent provided by the outline and based on a local context provided by the step of refining the keywords.

4. The method of claim 1, further comprising the step of:

the computer expanding the keywords to include (1) other keywords derived from the received keywords based on natural language processing techniques including stemming and synonyms, and (2) other keywords that are related to the received keywords based on one or more business glossaries, wherein the step of determining the metadata of the documents or the metadata of parts of the documents matches the at least one keyword includes determining the metadata of documents or the metadata of parts of the documents matches at least one of the expanded keywords.

5. The method of claim 1, further comprising the steps of:

subsequent to the step of adding the content to the new document and prior to the step of determining the new document is not complete, the computer receiving from a user a modification of the added content; and the computer automatically determining one or more keywords based on the modification of the added content, without the user identifying the one or more keywords, wherein the step of refining the keywords includes adding the one or more keywords to the received keywords based on the received modification of the added content.

6. The method of claim 1, further comprising the step of:

subsequent to the step of adding the content to the new document and prior to the step of determining the new document is not complete, the computer receiving from a user a modification of the added content and receiving from the user an identification of one or more keywords specifying the modification of the added content, wherein the step of refining the keywords includes adding the one or more keywords to the received keywords based in part on the received modification of the added content.

7. The method of claim 1, further comprising the step of:

the computer receiving from a user a selection indicating an aggressive retrieval or a conservative retrieval for the step of retrieving the documents or parts of the documents, wherein the step of determining the metadata of documents or the metadata of parts of the documents matches the one or more keywords includes determining the metadata of the documents or the metadata of parts of the documents matches any keyword included in the received keywords, if the selection indicates the aggressive retrieval, wherein the step of retrieving the documents or the parts of the documents is based on the metadata of the documents or the metadata of parts of the documents matching any keyword included in the received keywords, if the selection indicates the aggressive retrieval, wherein the step of determining the metadata of documents or the metadata of parts of the documents matches the one or more keywords includes determining the metadata of the documents or the metadata of parts of the documents matches all of the received keywords, if the selection indicates the conservative retrieval, and wherein the step of retrieving the documents or the parts of the documents is based on the metadata of the documents or the metadata of parts of the documents matching all of the received keywords, if the selection indicates the conservative retrieval.

8. The method of claim 1, further comprising the step of:

providing at least one support service for at least one of creating, integrating, hosting, maintaining, and deploying computer-readable program code in the computer, the program code being executed by a processor to implement the steps of receiving the keywords, determining the metadata, retrieving, generating, receiving the selection, adding, determining the new document is not complete, refining, and repeating.

9. A computer system comprising:

a central processing unit (CPU);

a memory coupled to the CPU; and a computer-readable, tangible storage device coupled to the CPU, the storage device containing instructions that are executed by the CPU via the memory to implement a method of creating a new document, the method comprising the steps of:

the computer system receiving keywords specifying a subject matter of the new document;

the computer system determining metadata of documents or metadata of parts of the documents matches one or more keywords included in the received keywords;

the computer system retrieving the documents or the parts of the documents whose metadata matches the one or more keywords;

based on a section or subsection being created in the new document, the computer system generating a ranked list of the retrieved documents or parts of the documents;

the computer system receiving a selection of a document or a part of a document included in the ranked list;

the computer system adding content to the new document, the added content being the document or the part of the document whose selection was received;

the computer system determining the new document is not complete;

the computer system refining the keywords based in part on the added content; and based in part on the subject matter and the refined keywords, the computer system completing the new document by repeating the steps of determining the metadata, retrieving the documents, generating the ranked list, receiving the selection, and adding the content.

10. The computer system of claim 9, wherein the method further comprises the steps of:
the computer system receiving an outline of sections and subsections in the new document; and
the computer system receiving an association between the outline and the received keywords, wherein the step of completing the new document is based in part on the outline and the association between the outline and the received keywords.

11. The computer system of claim 10, wherein the step of completing the new document is further based on a global intent provided by the outline and based on a local context provided by the step of refining the keywords.

12. The computer system of claim 9, wherein the method further comprises the step of:
the computer system expanding the keywords to include (1) other keywords derived from the received keywords based on natural language processing techniques including stemming and synonyms, and (2) other keywords that are related to the received keywords based on one or more business glossaries,
wherein the step of determining the metadata of the documents or the metadata of parts of the documents matches the at least one keyword includes determining the metadata of documents or the metadata of parts of the documents matches at least one of the expanded keywords.

13. The computer system of claim 9, wherein the method further comprises the steps of:
subsequent to the step of adding the content to the new document and prior to the step of determining the new document is not complete, the computer system receiving from a user a modification of the added content; and
the computer system automatically determining one or more keywords based on the modification of the added content, without the user identifying the one or more keywords,
wherein the step of refining the keywords includes adding the one or more keywords to the received keywords based on the received modification of the added content.

14. The computer system of claim 9, wherein the method further comprises the step of:
subsequent to the step of adding the content to the new document and prior to the step of determining the new document is not complete, the computer system receiving from a user a modification of the added content and receiving from the user an identification of one or more keywords specifying the modification of the added content,
wherein the step of refining the keywords includes adding the one or more keywords to the received keywords based in part on the received modification of the added content.

15. A computer program product, comprising:
a computer-readable, tangible storage device; and
a computer-readable program code stored in the computer-readable, tangible storage device, the computer-readable program code containing instructions that are executed by a central processing unit (CPU) of a computer system to implement a method of creating a new document, the method comprising the steps of:
the computer system receiving keywords specifying a subject matter of the new document;
the computer system determining metadata of documents or metadata of parts of the documents matches one or more keywords included in the received keywords;
the computer system retrieving the documents or the parts of the documents whose metadata matches the one or more keywords;
based on a section or subsection being created in the new document, the computer system generating a ranked list of the retrieved documents or parts of the documents;
the computer system receiving a selection of a document or a part of a document included in the ranked list;
the computer system adding content to the new document, the added content being the document or the part of the document whose selection was received;
the computer system determining the new document is not complete;
the computer system refining the keywords based in part on the added content; and
based in part on the subject matter and the refined keywords, the computer system completing the new document by repeating the steps of determining the metadata, retrieving the documents, generating the ranked list, receiving the selection, and adding the content.

16. The computer program product of claim 15, wherein the method further comprises the steps of:
the computer system receiving an outline of sections and subsections in the new document; and
the computer system receiving an association between the outline and the received keywords, wherein the step of completing the new document is based in part on the outline and the association between the outline and the received keywords.

17. The computer program product of claim 16, wherein the step of completing the new document is further based on a global intent provided by the outline and based on a local context provided by the step of refining the keywords.

18. The computer program product of claim 15, wherein the method further comprises the step of:
the computer system expanding the keywords to include (1) other keywords derived from the received keywords based on natural language processing techniques including stemming and synonyms, and (2) other keywords that are related to the received keywords based on one or more business glossaries,
wherein the step of determining the metadata of the documents or the metadata of parts of the documents matches the at least one keyword includes determining the metadata of documents or the metadata of parts of the documents matches at least one of the expanded keywords.

19. The computer program product of claim 15, wherein the method further comprises the steps of:
subsequent to the step of adding the content to the new document and prior to the step of determining the new document is not complete, the computer system receiving from a user a modification of the added content; and
the computer system automatically determining one or more keywords based on the modification of the added content, without the user identifying the one or more keywords,
wherein the step of refining the keywords includes adding the one or more keywords to the received keywords based on the received modification of the added content.

20. The computer program product of claim 15, wherein the method further comprises the step of:
- subsequent to the step of adding the content to the new document and prior to the step of determining the new document is not complete, the computer system receiving from a user a modification of the added content and receiving from the user an identification of one or more keywords specifying the modification of the added content,
- wherein the step of refining the keywords includes adding the one or more keywords to the received keywords based in part on the received modification of the added content.

\* \* \* \* \*